United States Patent

[11] 3,630,811

| [72] | Inventor | Harvey Radus |
| | | 50 Dorchester Road, Scarsdale, N.Y. 10538 |
| [21] | Appl. No. | 1,243 |
| [22] | Filed | Jan. 7, 1970 |
| [45] | Patented | Dec. 28, 1971 |

[54] ARTIFICIAL TOPIARY CONSTRUCTION
5 Claims, 21 Drawing Figs.

[52] U.S. Cl. .................................................. 161/27,
47/41.12, 161/31, 248/27.8
[51] Int. Cl. .................................................. A41g 1/00
[50] Field of Search .......................................... 161/15-16,
25, 87, 31; 248/27.8; 47/41.12, 41.13

[56] References Cited
UNITED STATES PATENTS

| 2,891,354 | 6/1959 | Smithers | 47/41.12 |
| 2,618,901 | 11/1952 | Braun | 47/41.12 |
| 1,611,589 | 12/1926 | Janusek | 161/31 |
| 3,336,697 | 8/1967 | Davis | 47/41.12 |
| 3,438,839 | 4/1969 | Williams et al. | 161/22 |
| 3,458,384 | 7/1969 | Radus | 161/27 |
| 2,891,353 | 6/1959 | Smithers | 47/41.12 |
| 2,981,033 | 4/1961 | Cheetwood | 47/41.12 |
| 3,003,284 | 10/1961 | Smithers | 47/41.12 |
| 3,336,697 | 8/1967 | Davis | 47/41.12 |

*Primary Examiner*—Philip Dier
*Attorney*—Charles E. Temko

ABSTRACT: An artificial topiary construction including a resilient base of penetrable material, a plurality of correspondingly shaped floral-engaging elements, a plurality of artificial floral elements selectively engageable thereupon, and supporting pole means engaging said sphere.

PATENTED DEC 28 1971
3,630,811
SHEET 1 OF 3
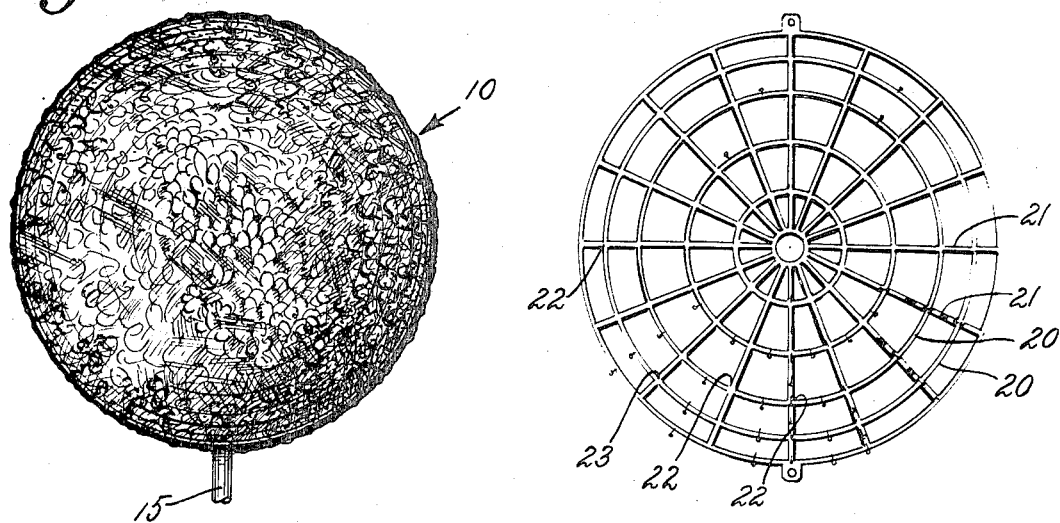
Fig.1
Fig.3
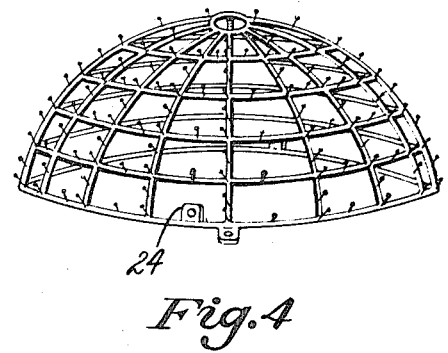
Fig.2
Fig.4
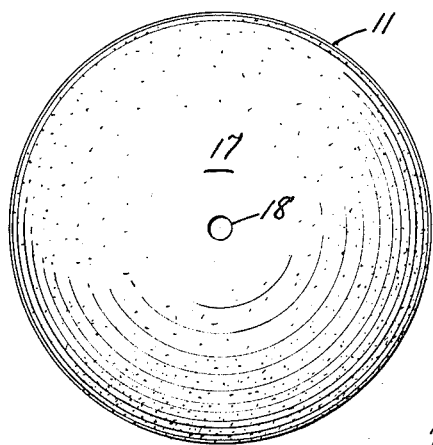
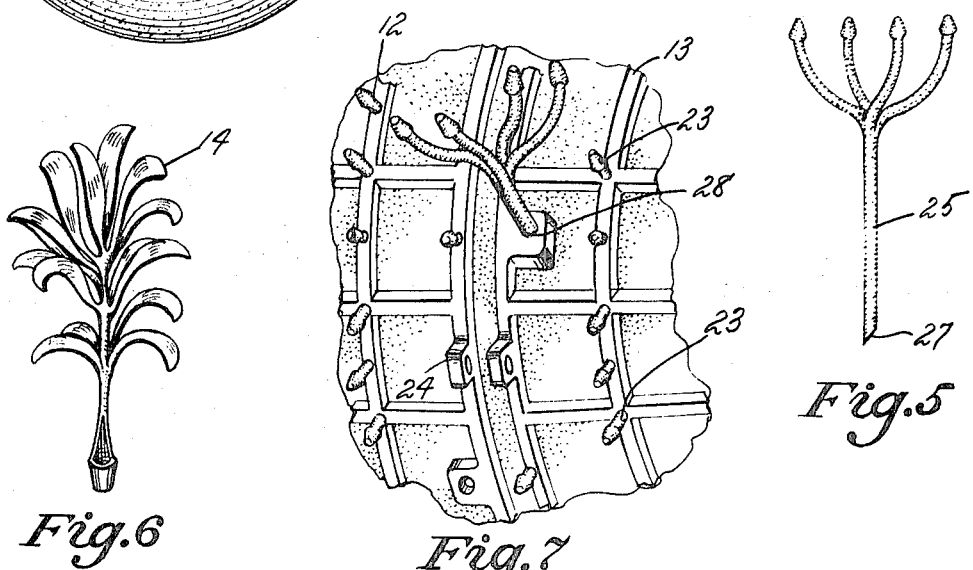
Fig.6
Fig.7
Fig.5

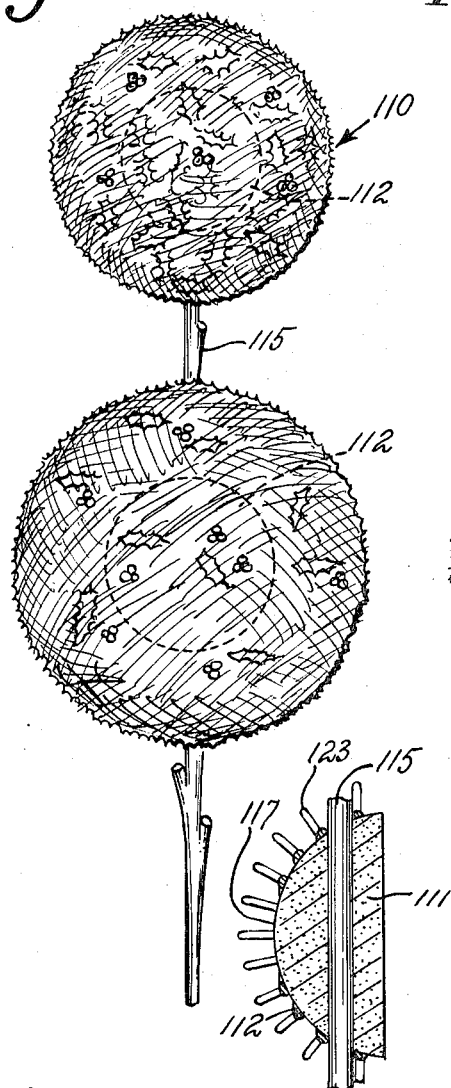
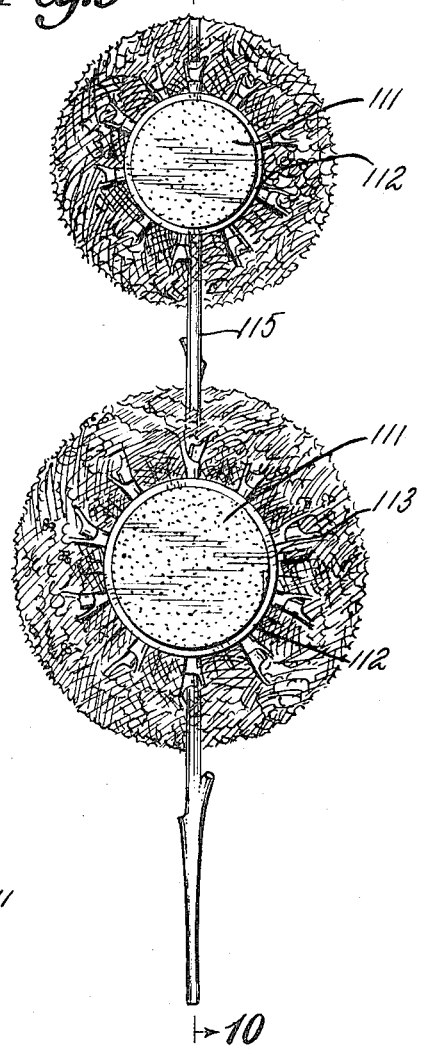
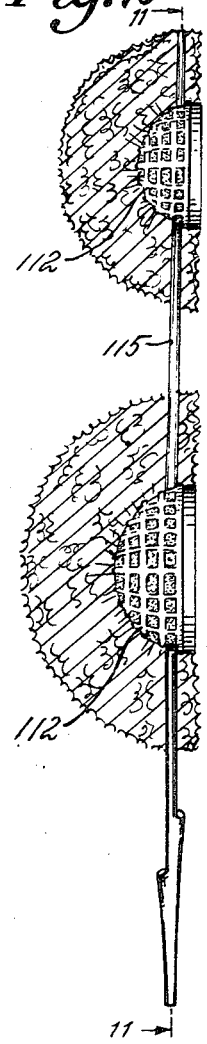
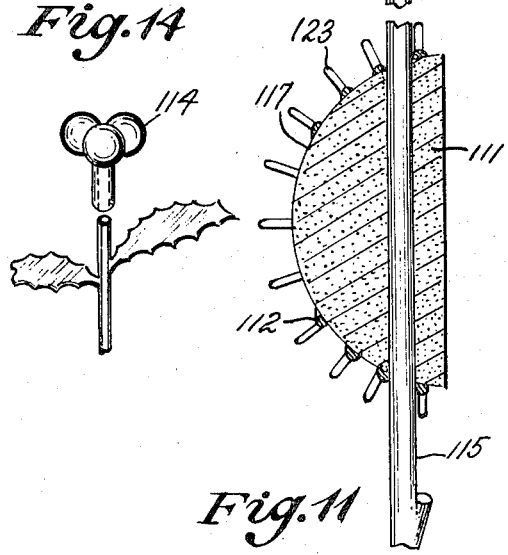
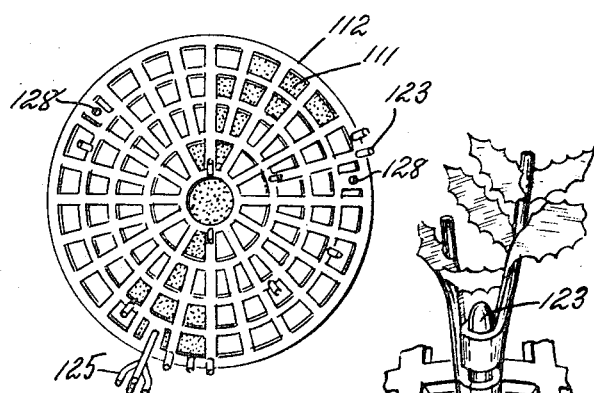
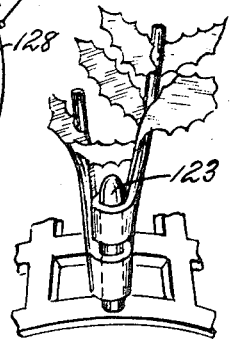

ARTIFICIAL TOPIARY CONSTRUCTION

This invention relates generally to the field of artificial flowers, and more particularly to an improved artificial topiary of the type disclosed in U.S. Pat. No. 3,458,384, of July 29, 1969. The present construction relates to an improved generally arcuately or spherically shaped topiary which may be supported on a vertically oriented supporting pole.

It is among the principal objects of the present invention to provide a shaped topiary of arcuate or spherical form.

Another object of the invention lies in the provision of an improved topiary construction of the class described, in which the cost of fabrication may be of a reasonably low order, thereby permitting consequent wide sale, distribution and use.

Still another object of the invention lies in the provision of an improved topiary construction, which may be conveniently assembled without the use of tools, and by those possessed of only ordinary skill.

Yet another object of the invention lies in the provision of an improved topiary having a resilient solid shape-imparting base, which prevents distortion of the shape of the finished article, should it be accidentally dropped or otherwise mishandled.

A feature of the disclosed article lies in the realistic effect achieved using the presently disclosed construction.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIG. 1 is a view in elevation of a first embodiment of the invention.

FIG. 2 is a view in elevation showing a styrene foam sphere which forms a base for attaching the other elements of the structure.

FIG. 3 is a top plan view showing one of a plurality of hemispherically shaped floral element-supporting means.

FIG. 4 is a perspective view of a support element.

FIG. 5 is a view in elevation of a pin used for attaching the support element to the sphere illustrated in FIG. 2.

FIG. 6 is an enlarged view in perspective of an individual artificial floral element, forming a part of the first embodiment.

FIG. 7 is a fragmentary view in perspective showing the insertion of the structure illustrated in FIG. 5 into the sphere to maintain the structure shown in FIG. 4 thereupon.

FIG. 8 is a front elevational view of the second embodiment of the invention.

FIG. 9 is a rear elevational view thereof.

FIG. 10 is a front elevational view thereof with certain structure broken away to show detail.

FIG. 11 is a fragmentary sectional view as seen from the plane 11—11 in FIG. 10.

FIG. 12 is a top plan view showing an individual floral element-supporting means.

FIG. 13 is an enlarged fragmentary view in perspective showing the interconnection of a floral element with the structure shown in FIG. 12.

FIG. 14 is an exploded view in perspective showing an individual floral element in accordance with the second embodiment of the invention.

Figure 21:
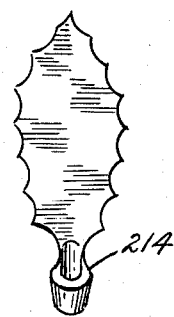
FIG. 21 is a view in perspective showing a floral element in accordance with the third embodiment of the invention.

Briefly stated, the invention contemplates the provision of a sphere, hemisphere or toroid, having a radially extending bore therein. A supporting pole engages the bore when the device is completely assembled for maintaining the same in desired position. Secured to the outer surface of the sphere are a plurality of arcuately shaped floral element supporting means, which in concert cover substantially the entire surface of the sphere. Attaching means extend radially outwardly of the supporting elements for the affixation thereon in selective manner of individual floral elements, which overlap each other to completely conceal the sphere and the supporting elements.

Referring now to the first embodiment of the invention illustrated in FIGS. 1-7, the device, generally indicated by reference character 10, comprises broadly, a styrene foam sphere 11 (FIG. 2), first and second hemispherically shaped support elements 12 and 13, attachable floral elements 14, and a supporting pole 15.

The sphere 11 is bounded by a continuous outer surface 17, through which a bore 18 extends.

The first and second supporting elements 12 and 13, are substantially similar, and preferably made by injection molding of polyethylene or other synthetic resinous material having similar properties. As best seen in FIGS. 3 and 4, each element includes a plurality of first arcuate members 20 which are concentrically arranged, and a second plurality of radially arranged arcuate members 21 interconnected at points 22. At each point of interconnection, a radially extending engaging means 23 of the type disclosed in my U.S. Pat. No. 3,458,384, of July 29, 1969, are positioned to engage the floral elements 14 in a similar manner. Mounted at convenient intervals on a peripheral arcuate member 20 are a plurality of hole-forming extensions 24 (FIGS. 4 and 7) penetrable by a pin 25 (FIG. 5), the lower end of which is pointed, and the upper end of which is modified to a configuration equivalent to that of the means 23. Thus, when the device is assembled, as shown in FIG. 1, the lower end 27 of the pin 25 may be pushed into the surface of the sphere 11, passing the opening 28 in the means 24. An element 14 may then be engaged on the free end thereof.

Assembly is completed by positioning both of the hemispherical support elements 12 and 13 on the sphere using pins 25, and subsequently attaching the floral elements to the means 23, the spread of which is sufficient to completely conceal the supporting structure disposed therebeneath. Following full assembly, the pole 15 may be inserted into the bore 18, and the device mounted on suitable support means not shown.

It will be observed that by providing a lightweight sphere as a base support, which is conveniently molded and which provides a mounting surface for the remaining elements, the completed device will readily maintain its shape despite relatively rough handling. It is nonetheless of relatively light overall weight, so that it may be conveniently mounted on correspondingly lightweight supporting structure without difficulty.

Figure 15:
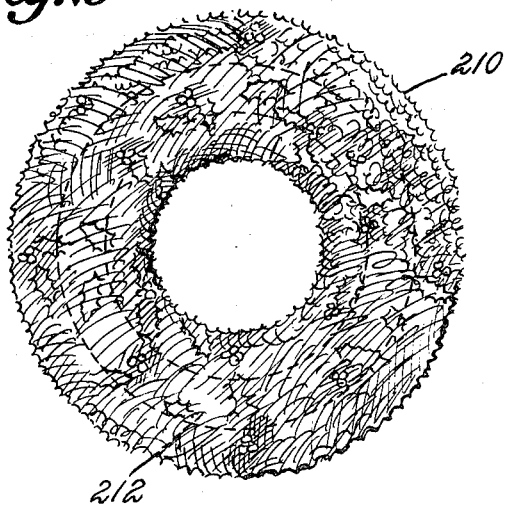
FIG. 15 is a front elevational view of the third embodiment of the invention.

Turning now to the second embodiment of the invention, illustrated in FIGS. 8 through 15, inclusive, parts corresponding to those of the first embodiment have been designated by similar reference characters with the additional prefix "1."

The second embodiment of the invention differs from the first embodiment in that the device 110 includes a pair of styrene foam hemispheres 111 as compared with a single full sphere 11 in the first embodiment. The spheres 111 are mounted one above the other on a supporting pole 115, each hemisphere being engaged with a support element 112 and 113.

Figure 20:
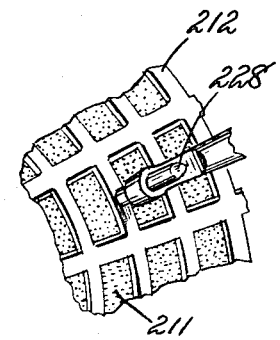
FIG. 20 is an enlarged fragmentary view in perspective showing the interconnection of structure shown in FIG. 21 upon structure shown in FIG. 19.
Figure 19:
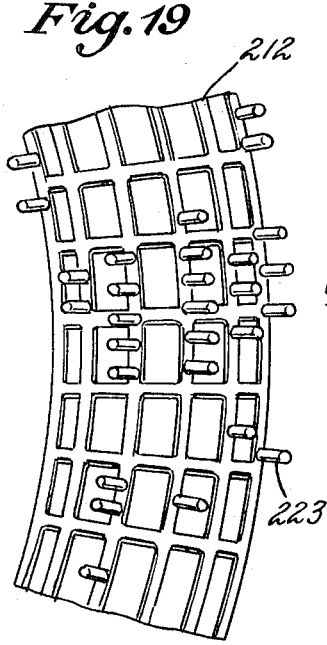
FIG. 19 is an enlarged fragmentary view in perspective corresponding to the right-hand portion of FIG. 18.
Figure 16:
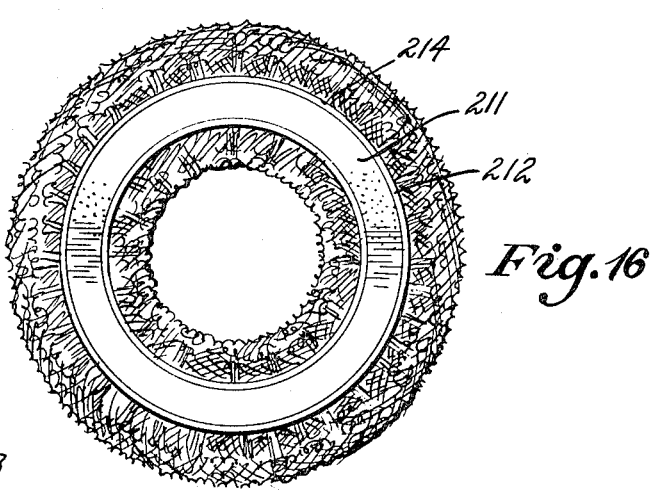
FIG. 16 is a rear elevational view of the third embodiment.
Figure 17:
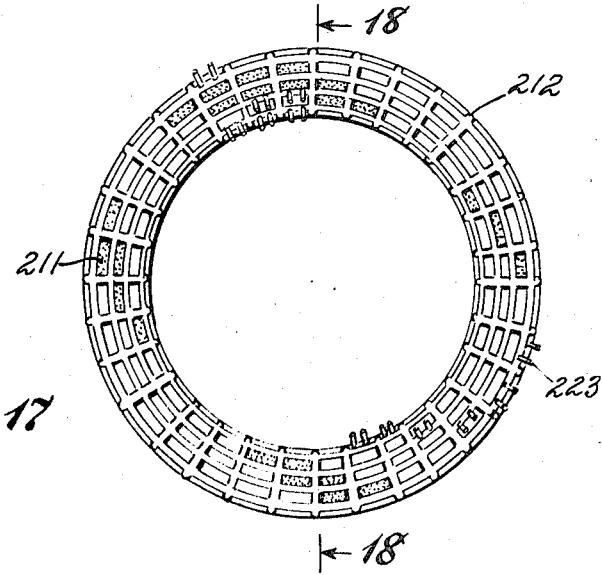
FIG. 17 is a view in elevation of a support element used in conjunction with the third embodiment.
Figure 18:
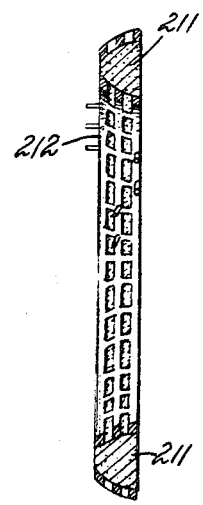
FIG. 18 is a sectional view as seen from the plane 18—18 in FIG. 17.

Turning now to the third embodiment of the invention illustrated in FIGS. 15 through 21 inclusive, parts corresponding to those of the first embodiment have been designated by similar reference characters with the additional prefix "2."

The third embodiment differs from the first and second embodiments in the provision of a toroidally shaped foam element 211 to provide a wreathlike display. The support element 212 is correspondingly shaped, and secured thereto in a similar manner. Because of its increased size, the supporting pole of the first and second embodiments may be normally eliminated with a corresponding loss of function.

I wish it to be understood that I do not consider the invention limited to the precise details of structure shown and set forth in this specification, for obvious modifications will occur to those skilled in the art to which the invention pertains.

I claim:

1. Artificial topiary construction comprising: a base of resilient penetrable material having an outer surface, a plurality of arcuately shaped supporting elements overlying predetermined portions of the outer surface of said base to substantially cover the same, said support elements having radially outwardly extending projections attached thereto, and floral element attaching means positioned on the free ends thereof, at substantially uniformly spaced intervals on said base and a plurality of artificial floral elements selectively attached to said attaching means to substantially cover said support elements.

2. Structure in accordance with claim 1, there being a radially extending bore in said base, and pole-supporting means engaging said bore.

3. Structure in accordance with claim 1, said supporting elements being substantially hemispherically shaped.

4. Structure in accordance with claim 1, said base being substantially hemispherically shaped.

5. Structure in accordance with claim 1, said base being toroidally shaped.

* * * * *